US012112641B2

(12) United States Patent
Sandridge et al.

(10) Patent No.: US 12,112,641 B2
(45) Date of Patent: Oct. 8, 2024

(54) MULTI-VEHICLE COLLABORATION WITH GROUP VISUALIZATION

(71) Applicant: International Business Machines Corporation, Armonk, NY (US)

(72) Inventors: Thomas Jefferson Sandridge, Tampa, FL (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 17/672,079

(22) Filed: Feb. 15, 2022

(65) Prior Publication Data

US 2023/0260404 A1    Aug. 17, 2023

(51) Int. Cl.
*G08G 1/00* (2006.01)
*B60K 35/00* (2024.01)
(Continued)

(52) U.S. Cl.
CPC ............... *G08G 1/22* (2013.01); *B60K 35/00* (2013.01); *B60W 30/16* (2013.01); *B60W 40/02* (2013.01);
(Continued)

(58) Field of Classification Search
CPC . G08G 1/22; G08G 1/20; B60K 35/00; B60K 35/28; B60K 2360/176;
(Continued)

(56) References Cited

U.S. PATENT DOCUMENTS 9,550,419 B2    1/2017  Habashima
9,612,123 B1 *  4/2017  Levinson ............. G05D 1/6987
(Continued)

FOREIGN PATENT DOCUMENTS

CN    105321362 B    10/2017
DE    102014214514 A1    1/2016
(Continued)

OTHER PUBLICATIONS

"Automotive 2025—How consumers, mobility, and blurred boundaries disrupt the industry", IBM, Downloaded Nov. 11, 2021, 7 pages, <https://www.ibm.com/thought-leadership/institute-business-value/report/auto2025>.
(Continued)

*Primary Examiner* — Mussa A Shaawat
(74) *Attorney, Agent, or Firm* — Daniel M. Yeates

(57) ABSTRACT

A computer-implemented method to provide collaboration between a group of vehicles. The method includes linking two or more vehicles into a group, wherein each vehicle is partially automated, includes a plurality of sensors, and are performing a common task. The method further includes generating, for each vehicle, a 360 degree view of the vehicle with data from the plurality of sensors. The method includes aggregating the 360 degree view for each vehicle into a group view, that includes all the grouped vehicles. The method includes displaying the group view on an augmented reality (AR) device a, where the group view includes a relative location for each vehicle in the group. The method includes applying a set of rules to the group of vehicles, wherein the rules provide instructions to each vehicle how to operate within the group, where the set of rules is configured to complete the task.

20 Claims, 5 Drawing Sheets

(51) Int. Cl.
| | |
|---|---|
| *B60W 30/16* | (2020.01) |
| *B60W 40/02* | (2006.01) |
| *B60W 50/14* | (2020.01) |
| *G05D 1/00* | (2006.01) |
| *G05D 1/02* | (2020.01) |
| *H04W 4/46* | (2018.01) |
| *B60K 35/28* | (2024.01) |

(52) U.S. Cl.
CPC ........... *B60W 50/14* (2013.01); *G05D 1/0295* (2013.01); *H04W 4/46* (2018.02); *B60K 35/28* (2024.01); *B60K 2360/176* (2024.01); *B60K 2360/177* (2024.01); *B60W 2050/146* (2013.01); *B60W 2556/65* (2020.02)

(58) Field of Classification Search
CPC . B60K 2360/177; B60W 30/16; B60W 40/02; B60W 50/14; B60W 2050/146; B60W 2556/65; G05D 1/0295; H04W 4/46
See application file for complete search history.

(56) References Cited

U.S. PATENT DOCUMENTS

| | | | |
|---|---|---|---|
| 10,214,350 | B2 | 2/2019 | Liu |
| 10,812,996 | B2 | 10/2020 | Tavares Coutinho |
| 10,967,833 | B1* | 4/2021 | Nagao ................. B60R 25/1012 |
| 11,507,084 | B2* | 11/2022 | Sharma ................ G06V 20/582 |
| 2007/0005609 | A1* | 1/2007 | Breed ................... B60W 30/04 |
| 2017/0025017 | A1* | 1/2017 | Thomas ................ B60W 10/20 |
| 2019/0086914 | A1 | 3/2019 | Yen |
| 2019/0294895 | A1 | 9/2019 | Kleen |
| 2019/0323855 | A1* | 10/2019 | Mahler .................... G01S 17/89 |
| 2020/0209889 | A1* | 7/2020 | Dev .......................... B60R 1/27 |
| 2020/0349850 | A1* | 11/2020 | Park ........................ H04W 4/46 |
| 2021/0031758 | A1* | 2/2021 | Urano ............... B60W 30/0953 |
| 2021/0379992 | A1* | 12/2021 | Domeyer ................. B60Q 1/20 |
| 2022/0097522 | A1* | 3/2022 | Jung ....................... B60K 35/00 |
| 2022/0126883 | A1* | 4/2022 | Ucar ...................... H04W 76/15 |

FOREIGN PATENT DOCUMENTS

| | | |
|---|---|---|
| DE | 102019211208 A1 | 2/2021 |
| EP | 2703873 A2 | 3/2014 |

OTHER PUBLICATIONS

"BMW X3: 3D Surround View (360 degree view cameras) :: [1001cars]", YouTube, Dec. 2, 2017, 3 pages, <https://www.youtube.com/watch?v=q43umm8UgYM>.

"Disruptive automotive technology solutions", IBM, Downloaded Nov. 11, 2021, 9 pages, <https://www.ibm.com/industries/automotive>.

"IBM Watson is AI for smarter business", IBM, Downloaded Nov. 11, 2021, 9 pages, <https://www.ibm.com/watson>.

"Internet of Things on IBM Cloud", IBM, Downloaded Nov. 11, 2021, 9 pages, <https://www.ibm.com/cloud/internet-of-things>.

Dube et al., "Automotive industry architecture", Downloaded Nov. 11, 2021, 9 pages, <https://www.ibm.com/cloud/architecture/architectures/automotive/>.

Koederitz et al., "Automotive Industry-Global Industry Agenda", © 2018 IBM Corporation, 10 pages, <https://www.ibm.com/services/us/gbs/thoughtleadership/giaauto/>.

Mell et al., "The NIST Definition of Cloud Computing", Recommendations of the National Institute of Standards and Technology, Special Publication 800-145, Sep. 2011, 7 pages.

Nica, Gabriel, "Video: BMW Explains How Surround View Cameras Can Be Used", Apr. 18, 2019, 10 pages, <https://www.bmwblog.com/2019/04/18/video-bmw-explains-how-surround-view-cameras-can-be-used/>.

Winkelmann, Holger, "Driving innovation for connected cars using IBM Cloud", Feb. 4, 2020, 8 pages, <https://www.ibm.com/blogs/cloud-computing/2020/02/04/driving-innovation-connected-cars-ibm-cloud/>.

International Search Report and Written Opinion of the International Searching Authority, International Application No. EP2023/053682, P202102598PCT01, Date of Mailing May 17, 2023, 10 pages.

* cited by examiner

MULTI-VEHICLE COLLABORATION WITH GROUP VISUALIZATION

BACKGROUND

The present disclosure relates to self-driving vehicles, and, more specifically, to collaboration among two or more network connected vehicles.

People spend a large amount of time in their vehicles. The more vehicles are automated safely, the more the passengers can use that time to accomplish tasks other than driving.

SUMMARY

Disclosed is a computer-implemented method to provide collaboration between a group of connected vehicles. The method includes linking, over a network, two or more vehicles into a group of vehicles, wherein each of the two or more vehicles are at least partially automated, each of the vehicles includes a plurality of sensors, and each of the vehicles are performing a common task. The method further includes receiving, generating, for each vehicle, a 360 degree view from each vehicle of the set of vehicles, wherein each 360 view is based on data from the plurality of sensors. The method also includes aggregating the 360 degree view for each vehicle into a group view, that includes each vehicle of the two or more vehicles. The method includes, sending, to each vehicle, the group view, wherein the group view is configured to be displayed on an augmented reality (AR) device in each vehicle, wherein the group view includes a relative location for each vehicle in the group of vehicles. The method also includes monitoring a set of rules applied to the group of vehicles, wherein the rules provide instructions to each vehicle how to operate within the group, wherein the set of rules is configured to complete the common task. Further aspects of the present disclosure are directed to computer program products containing functionality consistent with the method described above.

Further disclosed is a computer-implemented system to provide collaboration between a group of connected vehicles. The system comprises a processor and a computer-readable storage medium communicatively coupled to the processor and storing program instructions which, when executed by the processor, are configured to cause the processor to link, over a network, two or more vehicles into a group of vehicles, wherein each of the two or more vehicles are at least partially automated, each of the vehicles includes a plurality of sensors, and each of the vehicles are performing a common task. The program instructions are further configured to cause the processor to generate, for each vehicle, a 360 degree view of the vehicle with data from the plurality of sensors. The program instructions are also configured to cause the processor to aggregate the 360 degree view for each vehicle into a group view, that includes each vehicle of the two or more vehicles. The program instructions are configured to cause the processor to display the group view on an augmented reality (AR) device a first vehicle, wherein the group view includes a relative location for each vehicle in the group of vehicles. The program instructions are further configured to cause the processor to apply a set of rules to the group of vehicles, wherein the rules provide instructions to each vehicle how to operate within the group, wherein the set of rules is configured to complete the common task.

The present Summary is not intended to illustrate each aspect of every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
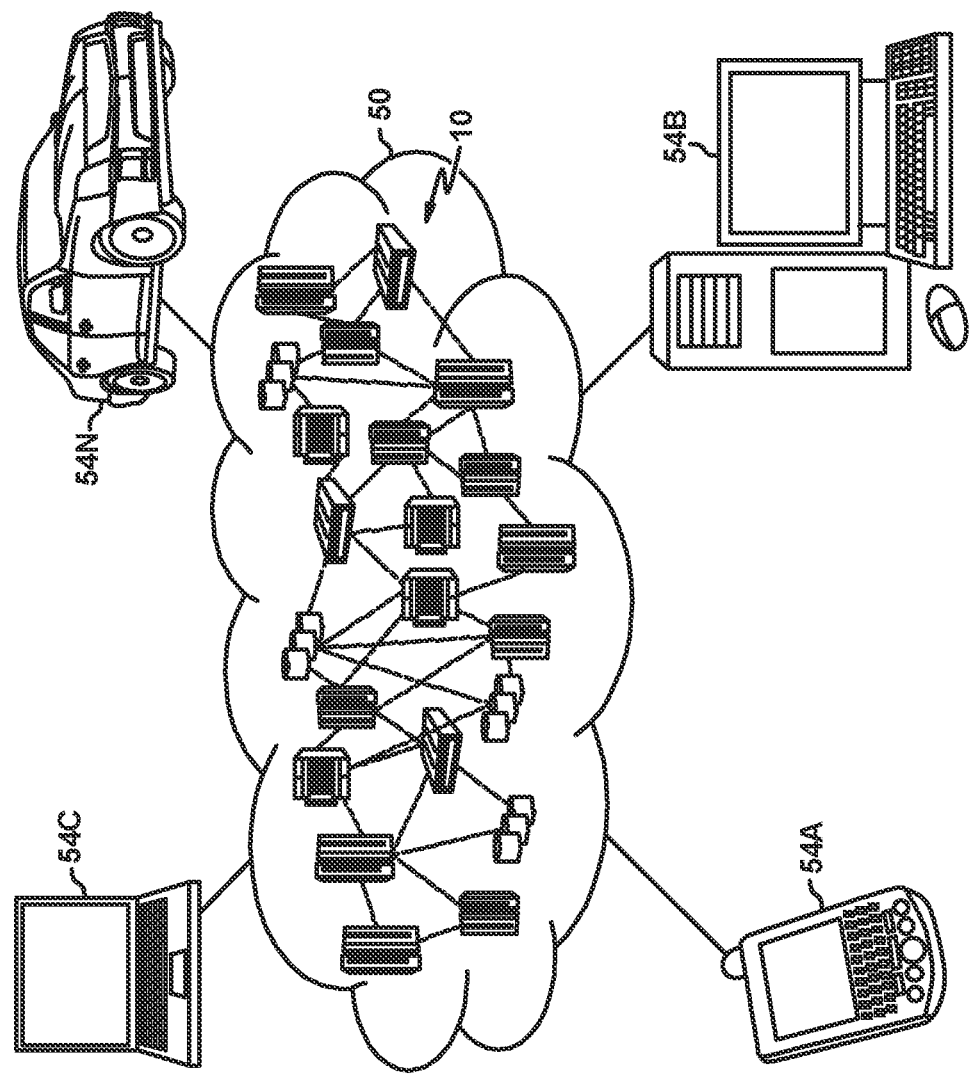
FIG. 1 depicts a cloud computing environment, according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
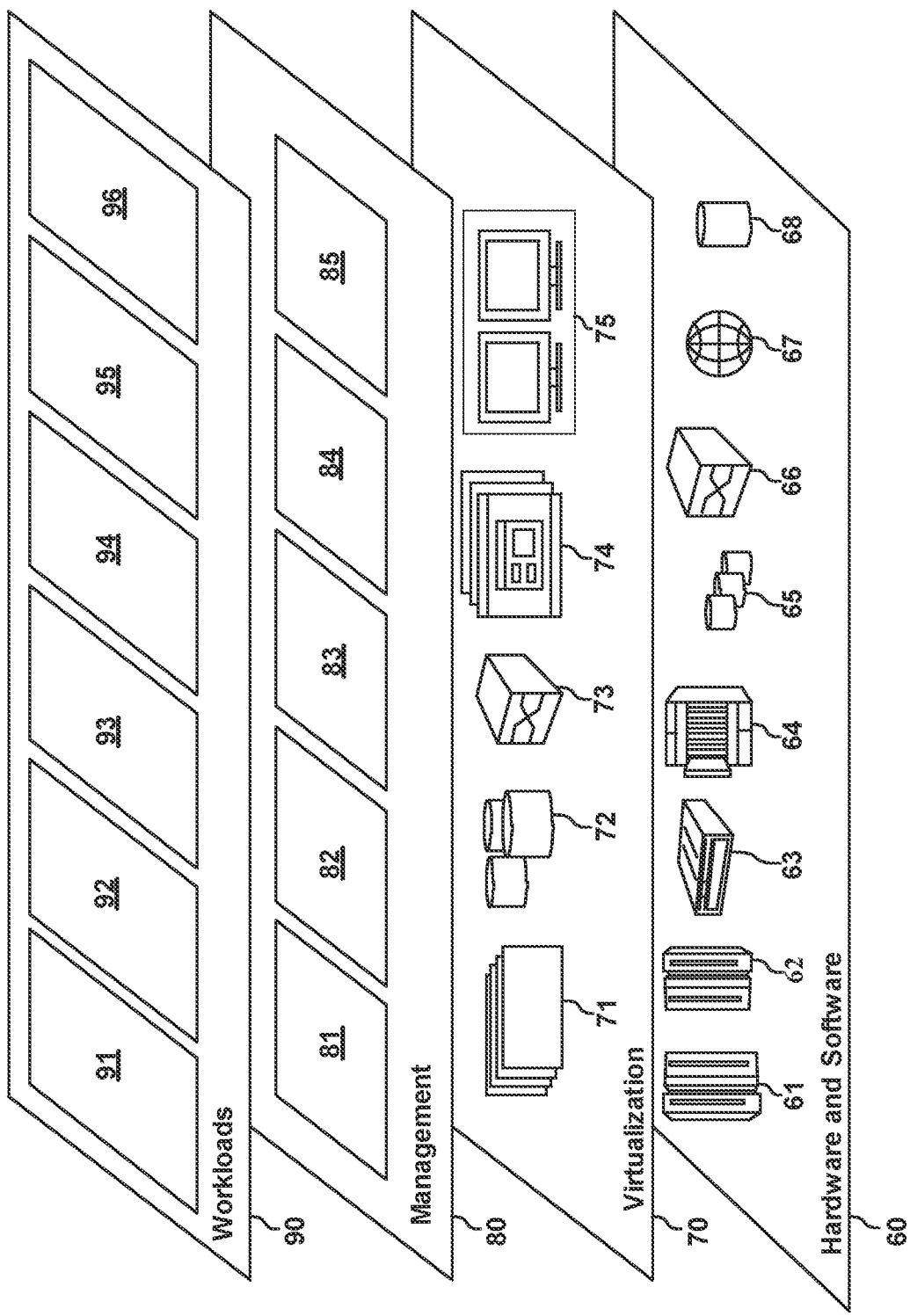
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaboration amount automated vehicles 96.

Data Processing System in General

Figure 3:
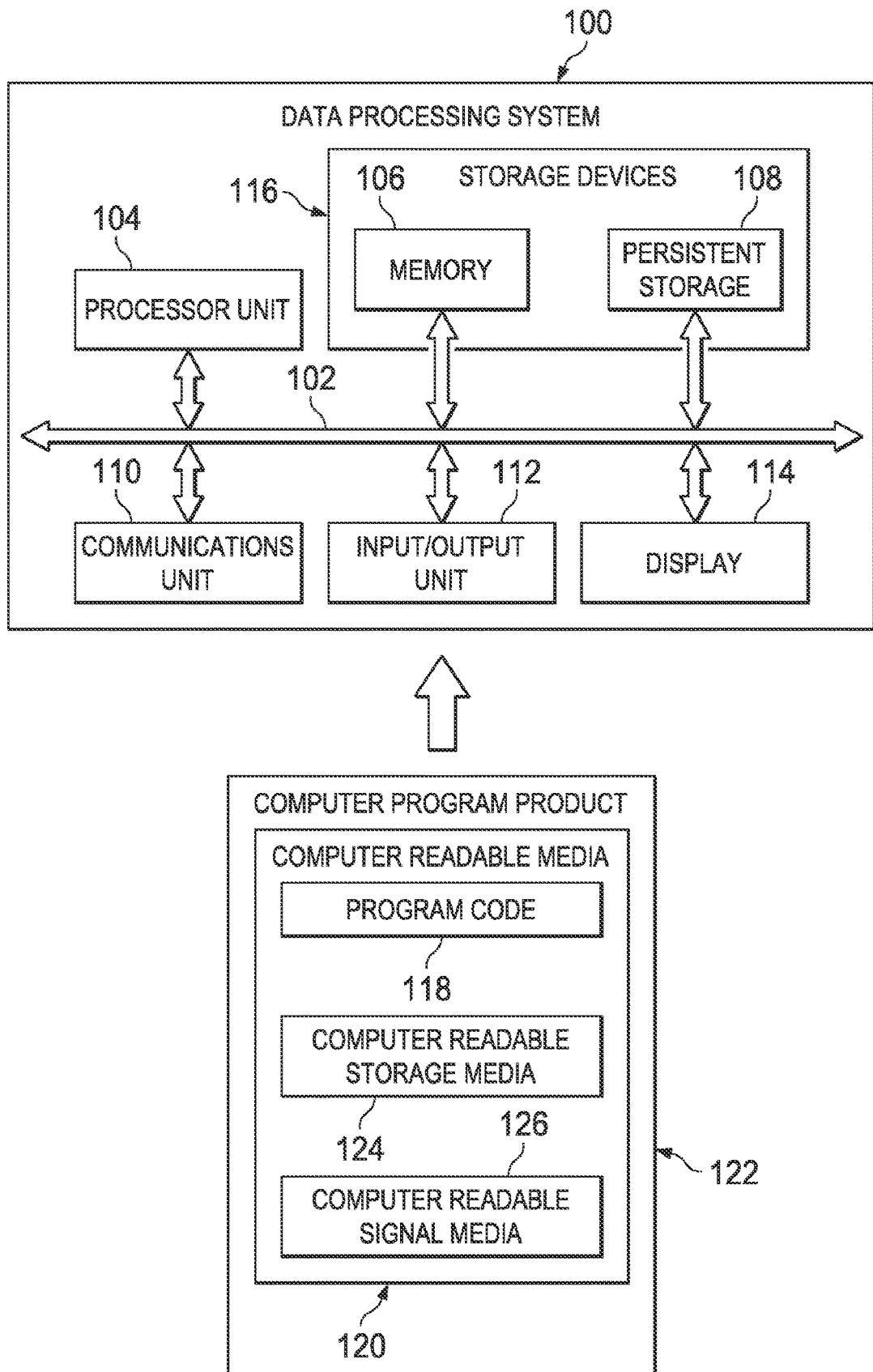
FIG. 3 is a block diagram of a data processing system (DPS), according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

Often when traveling, two or more vehicles attempt to caravan together. Traveling in such a manner can be beneficial to get to a common destination, to have help if an issue occurs, and/or any other of a myriad of reasons. Sometimes a group of vehicles are attempting to complete a common task such as plowing and seeding/harvesting crops, clearing snow, and the like. In addition to automating the actions of the vehicles, there is an additional benefit gained from allowing collaboration between vehicles in the group. Additionally, a visual display of each vehicle in the group and a mechanism to input changes can also increase the usefulness and efficiency of the groups of vehicles trying to accomplish a task.

Embodiments of the present disclosure allow for collaboration between a group of connected vehicles. In some embodiments, each of the vehicles has some level of automation. Embodiments of the present disclosure include a vehicle manager that coordinates and executes rules to assists in the collaboration of a group of vehicles. The vehicle manager can be located in a computing device. The device can be located in one or more of the vehicles and/or at a remote data processing location.

In some embodiments, the vehicle manager can identify and link/connect two or more vehicles (or smart vehicles) into a caravan/group. The connection can be through the components built into the vehicles and/or a device temporarily placed in the vehicle. The vehicles in the group can form an ad-hoc network. The network can allow for collaboration between the vehicles and/or passengers within each of the vehicles. In some embodiments, each of the vehicles is at least partially automated. The automations perform vehicle functions independent of any input from a passenger.

In some embodiments, each of the vehicles can include one or more sensors. The sensors can identify various conditions surrounding the vehicles. Each vehicle can have the same and/or a different set of sensors. In some embodiments, the sensors include cameras, temperature sensors, speed sensors, location sensors (e.g., GPS), distance sensors (e.g., determine distance to objects), and the like. Each vehicle can include any number of any type of sensors. Two vehicles in a group can have the same and/or a different set of sensors. The sensors can send data to the automated driving system and to the vehicle manager. In some embodiments, each vehicle can generate a 360° view surrounding the vehicle based on one or more sensors.

In some embodiments, the vehicle manager can generate a visual display of the group of vehicles. In some embodiments, the display shows a relative location of each vehicle against the group and against a location of the group (e.g., which lane in a highway, location within a fenced field, etc.). The display can be displayed on one or more augmented reality (AR) devices. An AR device can be integrated into vehicle (e.g., Heads up Display on windshield) and/or temporarily brought into the vehicle (e.g., smart glasses). In some embodiments, the AR interface can display data about each of the vehicles. In some embodiments, the sensor data can be used by the vehicle manager to generate the AR interface.

In some embodiments, the vehicle manager can include other information about each vehicle in the display. For example, the information can include speed, distances, acceleration, self-driving status (e.g., self-driving mode v. human-driving mode), and the like.

In some embodiments, the vehicle manager applies rules to the group of vehicles. The rules can instruct each vehicle on how to collaborate with each of the other vehicles. The rules can dictate relative positions, speeds, and/or how the vehicles otherwise interact. The rules or relative positions can be updated. The updates are received through the AR device and the vehicle manager sends the relevant updates to the automated portion of each vehicle to perform.

In some embodiments, the vehicle manager can implement driving rules. The rules can designate one or more factors that determine the relationships between each of the vehicles. The rules can designate a route, speed, distance between vehicles, and/or other similar factors. In some embodiments, each vehicle can send a request for changes to the rules and/or for temporary changes (e.g., a rest stop, etc.). In some embodiments, vehicles can be added to and/or removed from the group. As vehicles are added/removed, the display of the group is updated and the ruled applied to any newly added vehicles.

The aforementioned advantages are example advantages, and embodiments exist that can contain all, some, or none of the aforementioned advantages while remaining within the spirit and scope of the present disclosure.

Figure 4:
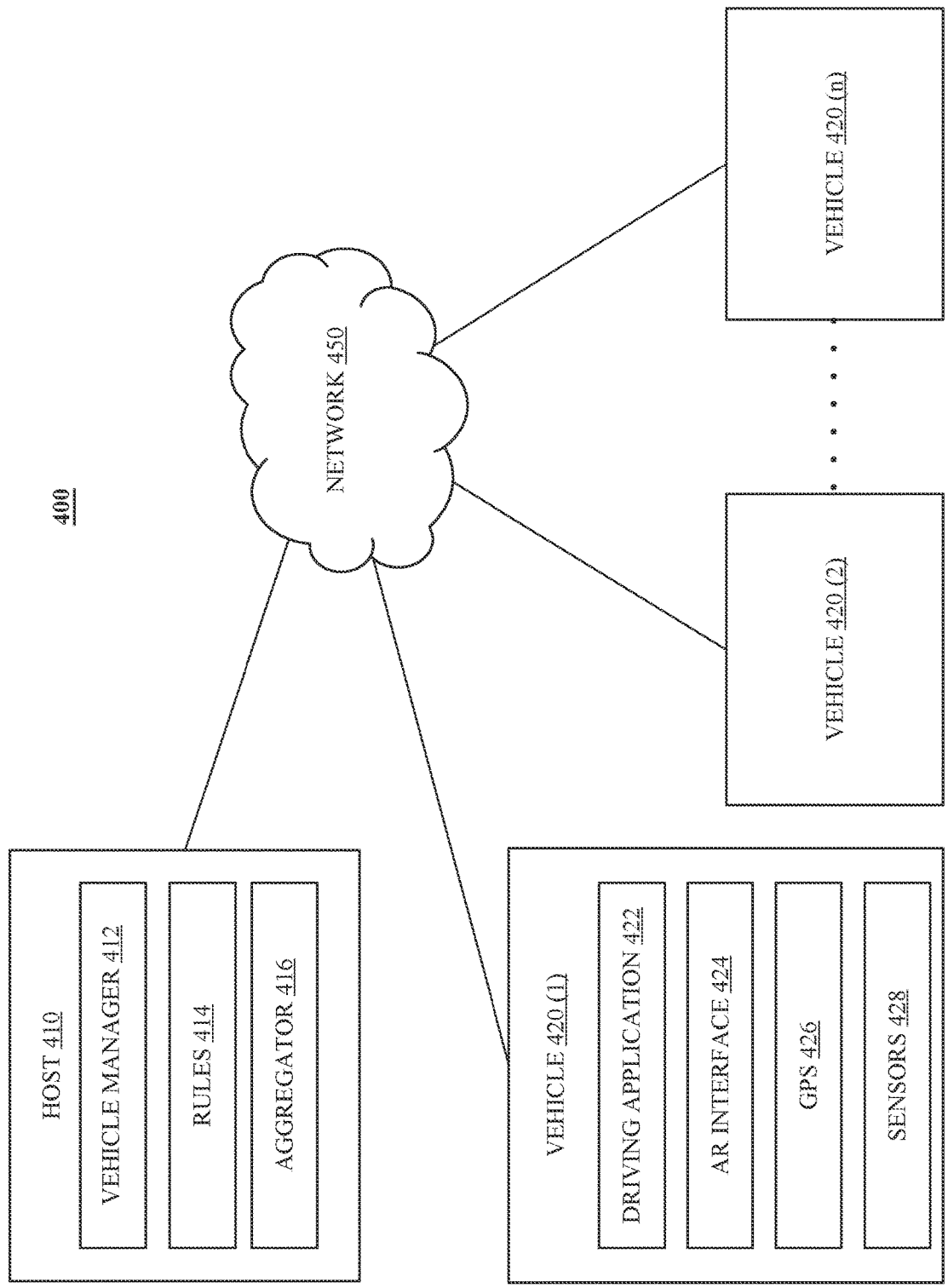
FIG. 4 illustrates a functional diagram of a computing environment suitable for operation of a vehicle manager, in accordance with some embodiments of the present disclosure.

Referring now to various embodiments of the disclosure in more detail, FIG. 4 is a representation of a computing environment 400, that is capable of running a vehicle manager in accordance with one or more embodiments of the present disclosure. Many modifications to the depicted environment may be made by those skilled in the art without departing from the scope of the disclosure.

Computing environment 400 includes host 410, vehicle 420(1), vehicles 420(2), up to vehicle 420(n), where n can represent any number of vehicles, and network 450. Vehicle 420(1), vehicle 420(2), and vehicle 420(n) can be referred to individually, severally, and/or representatively as vehicle 420. In some embodiments, each of host 410, and vehicle 420 may include a computer system, such as the data processing system 100 of FIG. 3. In some embodiments, computing environment 400 includes or is a part of a cloud computing environment such as cloud computing environment 50.

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between and among host 410, any number of vehicles 420, and other computing devices (not shown) within computing environment 400.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes vehicle manager 412, grouping rules 414, and aggregator 416. In some embodiments, host 410 and/or any number of its subcomponents can be implemented into one or more vehicles 420. Components are shows as separate entities for discussion purposes, but one or more of the components may be integrated into a single device (such as a computer system). In some embodiments, host 410 can be separate from vehicle 420. For example, host 410 can be located in a data center for a service provider or another similar remote (e.g., remote from the vehicle 420) location.

Vehicle manager 412 can be any combination of hardware and/or software configured to manage a group of two or more vehicles (e.g., vehicles 420). In some embodiments, the vehicles are traveling as a group. In some embodiments, vehicle manager 412 includes group rules 414 and/or aggregator 416, however, they are shown as separate for discussion purposes. In some embodiments, vehicle manager 412, group rules 414, and/or aggregator 416 can be separate computing devices connected by network 450 and/or included in one or more vehicles 420. In some embodiments, all or some of the vehicles 420 can include a vehicle manager 412. Each vehicle manager 412 can coordinate actions with each of the other instances in the different vehicles.

In some embodiments, vehicle manager 412 creates/generates a group of vehicles 420. The group can be based on one or more rules 414. In some embodiments, the group is predefined by one or more passengers within any of the vehicles 420. In some embodiments, vehicle manager 412 can allow/enable collaboration between the vehicles in the group. The collaboration can allow the vehicles to caravan to a destination while responding to inputs from users. For example, the collaboration can allow a passenger to request a rest stop. In another example, the collaboration can allow for the vehicles to maintain a specific formation. Each vehicle will maintain a predetermined distance between other vehicles, what speed to travel, and the like. In some embodiments, vehicle manager 412 can add and/or remove vehicles from the group. The addition/removal can occur pre-transit, and/or in-transit.

Group rules 414 can be a set of rules and/or a policy that dictates how vehicle manager 412 instructs each vehicle 420 to proceed in the group of vehicles. The rules can manage when vehicles are added and/or exit groups. In some embodiments, group rules 414 can be updated by one or more passengers. The updates can change/request to change one or more aspects of the group traveling together.

Aggregator 416 can be any combination of hardware and/or software configured to aggregate data from each vehicle 420 in the group of vehicles. In some embodiments, aggregator 416 compiles the data from all of the vehicles. Aggregator 416 can generate a visual depiction of the group of vehicles. The visual depiction can show the location of each vehicle in relation to each other vehicle in the group. In some embodiments, the visual depiction can include vehicles and objects that are not part of the group. In some embodiments, the visual display can include driving data about each vehicle. The driving data can include speed, direction, passengers, and the like. The display can also show distances between vehicles. The distances can be calculated by aggregator 416.

Vehicle 420 can be any vehicle. In some embodiments, vehicle 420 can be any machine that is propelled by an engine. In some embodiments, vehicle, 420 can be anything that is driven around on the ground (e.g., wheeled or unwheeled). The vehicle can be an automobile, a bicycle, an all-terrain vehicle, farm equipment, and any other type of movable machine. In some embodiments, vehicle 420 has some level of automation/self-driving capability. Each vehicle can include a computing device to manage the automation.

Driving application 422 can be any combination of hardware and/or software configured to automate at least a portion of vehicle 420. The automation can be any level of automation. In some embodiments, the automobile is fully automated. When fully automated, driving application 422 performs all functions to drive the vehicle such that a passenger/driver takes no actions and vehicle 422 continues to drive without user input. In some embodiments, the level of automation is very low, such that driving application 422 can perform a single action. For example, the automation can maintain an engine at a constant revolutions per minute (RPM) and/or a constant velocity. In some embodiments, the level of automation can be any level. Any function of driving can be performed by driving application 422. In some embodiments, driving application 422 can automate one or more of accelerating, decelerating, maintaining velocity, maintaining distance, steering, changing lanes, parking, and the like. In some embodiments, the driving application can manage an automated function in the vehicle unrelated to driving. This can include turning on/off attached equipment, passenger comfort actions, communications, and the like.

AR interface 424 can be any combination of hardware and/or software configured to display the group of vehicles. The display can be a three-dimensional display of the group of vehicles. In some embodiments, AR interface 424 can use visual, audible, and/or other computer sensory generated data to enhance perception. AR interface 424 can be embedded into a separate device (e.g., smart phone) from a vehicle. AR interface 424 can be overlayed on any surface (e.g., windshield, etc.) within vehicle 420. In some embodiments, AR interface 424 can accept input from one or more passengers within vehicle 420. The input can be directed to update one or more aspects of the group. The input can change the spacing of the vehicles, the speed of travel and/or other similar aspects of the group. In some embodiments, AR interface 424 can enhance/allow collaboration between vehicles and/or passengers of the group.

GPS 426 can be any combination of hardware and/or software configured to determine a location of vehicle 410 In some embodiments, GPS 426 can use one or more of satellites, triangulation, networks, and other similar methods to determine the location. In some embodiments, GPS 426 can track the geolocation of each vehicle. The location data can be sent to one or more of a driving application 422, vehicle manager 412 and/or aggregator 416.

Sensors 428 can be any combination of hardware and/or software configured to gather data surrounding a vehicle 420. Each vehicle 420 can include any number sensors and any number of types of sensors. In some embodiments, the type of sensors includes one or more of cameras, thermometers, heat detectors, moisture detectors, motion detections, microphones, distance detectors, and the like. The number and type of sensors can be configured to gather enough data to generate a 360 degree view of the vehicle and the vehicle's surroundings. In some embodiments, the various sensors can be placed in various locations around the vehicle. For example, a single vehicle can have cameras on the front, the rear, each corner, and along each side of the vehicle. The vehicle can also have a different type of sensor at the same or different location than each camera. In some embodiments, the data from each sensor 428 is sent to driving application 422 and/or aggregator 416. The data collected from sensors 428 can be used to generate the 360 degree view of the vehicle 420. The sensors can communicate with the driving application 422, vehicle manager 412, and/or aggregator 414 to determine a visual display of the vehicle with its surrounding.

Figure 5:
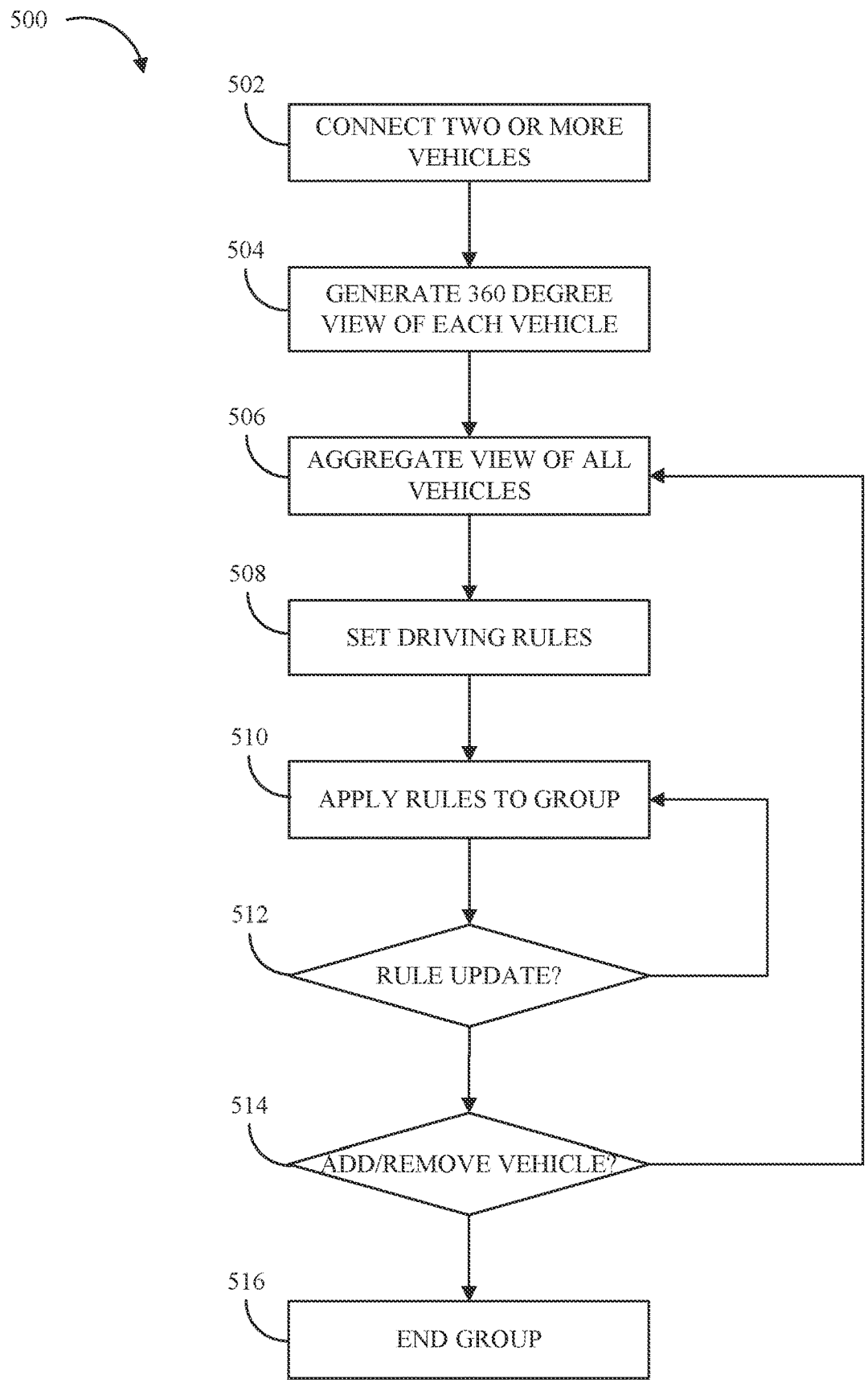
FIG. 5 illustrates a flow chart of an example method to provide collocation between a group of vehicles, in accordance with some embodiments of the present disclosure.

FIG. 5 depicts a flowchart of an example method, method 500, for collaboration between automated vehicles that can be performed in a computing environment (e.g., computing environment 400 and/or cloud computing environment 50). One or more of the advantages and improvements described above for collaboration between two or more automated vehicles may be realized by method 500, consistent with various embodiments of the present disclosure.

Method 500 can be implemented by one or more processors, host 410, vehicle manager 412, rules 414, aggregator 416, vehicle 420, driving application 422, GPS 426, AR interface 424, sensors 428 and/or a different combination of hardware and/or software. In various embodiments, the various operations of method 500 are performed by one or more of host 410, vehicle manager 412, rules 414, aggregator 416, vehicle 420, driving application 422, GPS 426, AR interface 424, and/or sensors 428. For illustrative purposes, the method 500 will be described as being performed by vehicle manager 412.

At operation 502, vehicle manager 412 connects/links two or more vehicles. In some embodiments, operation 502 includes identifying two or more vehicles 420. The two or more vehicles can be smart vehicles. In some embodiments, operation 502 includes identifying two or more vehicles that can be linked. In some embodiments, the linking allows the two or more vehicles to share driving and/or sensor data with each other vehicle and/or vehicle manager 412. The link can include any type of network connection. In some embodiments, one vehicle/vehicle manager 412 is selected as a lead vehicle. The lead vehicle can set the rules for the group. The lead vehicle can also accept or reject various inputs from passengers of the two or more vehicles.

In some embodiments, the two or more vehicles are linked in response to accepting a linking request. The acceptance can be received based on an input from a passenger in the vehicle. The link request can be generated automatically and/or manually. In some embodiments, the automatic request can be generated if two or more smart vehicles are within a predetermined distance and traveling in on common direction and/or on a common road. In some embodiments, the request to link is generated in response to receiving an input from a passenger to link with another vehicle or a group of vehicles. In some embodiments, the inputs are revied by AR interface 424.

At operation 504, vehicle manager 412 generates a 360° view of each of the two or more vehicle. In some embodiments, the view is based on one or more sensors from each vehicle. In some embodiments, each of the two or more vehicles includes at least one camera. The camera and other sensor feeds can be used to create a 360° view around each vehicle.

At operation 506 vehicle manager 412 aggregates each vehicle view into a group view. The group view can include all grouped vehicles. In some embodiments, the group view can be displayed on one or more of the AR interfaces 424 for each vehicle 420.

In some embodiments, aggregator 416 combines all the individual views into a conglomerate(group) view, which can be a 3-D view of all the vehicles. In some embodiments, the group view includes vehicles that are in the vicinity of any of the vehicles, but not part of the group. In some embodiments, the group view can include non-vehicle objects. Non-vehicle objects can include lane indicators, pavement location, barriers, and other objects common to a road. In some embodiments, the group view can include additional information about the group. The additional information can include speed, direction of travel, distances (or relative distances) between two vehicles, and/or distances between vehicles and objects. In some embodiments, the aggregate(group) view can include one or more of the rules dictating the group collaboration.

In some embodiments, the aggregate view can display future locations. For example, if the relative location of one or more vehicles within the caravan is going to be changed, the display can show what the configuration will be once the change is complete. In some embodiments, the aggregate view can display when one vehicle is not in sync with the rules. For example, if a rule is supposed to maintain 100 feet of distance between two vehicles, and the actual distance is 150 feet, then the out of rule vehicle can be distinctly identified by visual and/or audio notification.

At operation 508 vehicle manager 412 sets the group rules. The group rules manage the collaboration between the vehicles. the rules can provide instruction to driving application 422 for each vehicle. In some embodiments, the rules can manage speed, relative location, following distances, and the like. In some embodiments, the rules manage when vehicles are added and/or removed from the group. In some embodiments, the rules are predefined. The rules can also be updated after formation of the group. In some embodiments, the lead vehicle can update the rules.

In some embodiments, the rules can be based on environmental conditions/external conditions. For example, the "following distance" can change based on temperature, moisture, rain, and other environmental factors. External factors can include relative traffic and/or lane/road width and the like. In some embodiments, the number of vehicles in the group can change the rules.

At operation 510, vehicle manager 412 applies the rules to the group. In some embodiments, vehicle manager 412 can analyze all the data from the various vehicles based on the analysis, and then the vehicle manager 412 can send instructions to the vehicles to change speed, location, direction, and/or the like. In some embodiments, all the instruction can be performed by driving application 422. The instruction can be for a portion of the vehicles that are automated.

In some embodiments, operation 510 includes determining a first vehicle is non-compliant with one or more rules. This can be determined by vehicle manager 412 and/or host 410. In some embodiments, in response to the determination vehicle manager 412/host 410 can send one or more instructions to the first vehicle configured to cause the first vehicle to become compliant. This can include changing a location, changing a speed, and the like. In some embodiments, the instruction can be configured to be executed(or initiated) by the automated portions of the vehicle. In some embodiments, an instruction is sent to a second vehicle to allow the first vehicle to become compliant and/or execute the instruction. For example, a second vehicle may slow down to allow the first vehicle to safely change lanes.

At operation 512, vehicle manager 412 determines if one or more rules have been updated. In some embodiments, a rule is updated in response to receiving an input from a passenger. The input can be received by AR interface 424. The request can be to change the driving plan. A change can be to take a rest stop at a different location, to change the relative position, to change a route, and the like. In some embodiments, a passenger can use AR interface 424 to manually update the relative positions and/or other aspects of the group that are displayed (e.g., speed, following distance). For example, a passenger/user can input for two or more vehicles to change relative positions and/or update the configuration of the vehicles in the group. One input method can be drag and drop on the display. Once all the changes are input, they can be submitted together. Vehicle manager 412 can analyze the changes and formulate a plan to update the group based on the new input. In some embodiments, the analyzing includes comparing the current/initial position of the vehicles against a final/future configuration. The future configuration can be based on the receive input. In some embodiments, vehicle manager 412 can, based on the analysis, generate a set of actions that need to be performed to get from the current state to the future state. Each of the actions can be correlated to a particular vehicle and each action can have a particular order. The actions can be sent to each correlated vehicle one by one. When a first action is finished, the associated vehicle notices vehicle manager 412 of completion, and the next command is sent until the final configuration is obtained. For example, assume the input is invented to move a lead vehicle in a caravan of vehicles to third in line. The order of actions can include, a second vehicle in line change lanes, then the third vehicle in line change lanes, then the current leader slows down, once the original second and third vehicle pass the slowed vehicle, to change lanes back to form a line. Each of these actions can be automated as to not require any additional action from the passengers of any vehicle. In some embodiments, the update includes changing one or more rules.

In some embodiments, the rule change can be in response to a change in conditions. The conditions can be outside of the control of the vehicles. Weather, traffic, and other similar factors can cause a change in the rules. For example, if a moisture sensor on a vehicle determines it is raining, then the group may slow down and/or increase a following distance.

If it is determined that one or more of the rules is updated (512:YES), then vehicle manager 412 returns to operation 510 to apply the new rules and update the group. If it is determined the no rules are updated (512:NO), then vehicle manager 412 proceeds to operation 514.

At operation 514, vehicle manager 412 determines if a vehicle should be removed and/or added to the group. In some embodiments, one or more rules determine if vehicles should be added and/or removed. In some embodiments, a lead vehicle and/or a passenger can determine if a vehicle is added and/or removed. In some embodiments, the group can receive a request from a vehicle to join and/or leave the group. The join/leaving can be based on the level of automation of the vehicle. For example, if one vehicle changes from auto driving to manual driving mode that can cause the vehicle to leave the group. In some embodiments, distance and/or direction of travel with the group dictates when a vehicle is added and/or removed. Any vehicle that has adequate automation and is within a predetermined distance (e.g., 0.25 miles) can be invited to join/added to the group. In some embodiments, there is a maximum number of vehicles that can be in the group. The maximum number can vary based conditions.

If it is determined that a vehicle should be added and/or removed from the group (514:YES), then vehicle manager 412 returns to operation 506 and updates the aggregate view of all the vehicles adding the new vehicle and/or subtracting the old vehicle. If it is determined that no vehicle should be added and/or removed from the group (514:NO), then vehicle manager 412 proceeds to operation 516.

In some embodiments, operation 512 and/or 514 can be performed simultaneously. vehicle manager 412 can continuously monitor for a rule to be updated and/or for a vehicle to be added and/or removed. It will continue to monitor and apply the current set of rules until either a change or the group ends.

At operation 516, vehicle manager 412 ends the group caravan. In some embodiments, the ending includes closing the connection between vehicles and/or removing the aggregated display. The ending can be in response to a predefined trigger. The trigger can include arriving at a destination, losing connection between vehicles, vehicles ending automated driving, a predefined time, a number of vehicles in the group, and the like.

Although many of the above examples are directed toward vehicles on a road, this is not intended to be limiting. Additional embodiments include, as one example, search and rescue vehicles. The vehicle can be automobiles and/or smaller all terrain vehicles. The aggregated view can be used to assists in vehicles maintaining spacing while performing searching operation. Another example is farming. The aggregated view can be used to increase the efficiency of plowing fields and ensuring smaller vehicles do not interfere with larger tractors with view restrictions. A third example is in recreation such as golf. The aggregated view and rules can increase the safety of participants ensuring golf carts maintain safe distances from hazards and assist in preventing collisions. A fourth example is public transportation. The aggregate view can be used to ensure adequate space for large vehicles. The rules can ensure buses at a school park far enough apart to maintain safety for the passengers.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    linking, over a network, two or more vehicles into a group of vehicles, wherein each of the two or more vehicles are at least partially automated, each of the vehicles includes a plurality of sensors, and each of the vehicles are performing a common task;
    receiving, generating, for each vehicle, a 360 degree view from each vehicle of the two or more vehicles, wherein each 360 view is based on data from the plurality of sensors;
    aggregating the 360 degree view for each vehicle into a group view, that includes each vehicle of the two or more vehicles;
    sending, to each vehicle, the group view, wherein the group view is configured to be displayed on an augmented reality (AR) device in each vehicle, wherein the group view includes a relative location for each vehicle in the group of vehicles; and
    monitoring a set of rules applied to the group of vehicles, wherein the rules provide instructions to each vehicle how to operate within the group, wherein the set of rules is configured to complete the common task.

2. The computer-implemented method of claim 1, further comprising:
    adding a new vehicle to the group, wherein the adding comprises:
        linking the new vehicle to each of the two or more vehicles;
        updating the group view to include the new vehicle; and
        applying the set of rules to the new vehicle.

3. The computer-implemented method of claim 2, wherein the adding is responsive to the new vehicle requesting to be added to the group.

4. The computer-implemented method of claim 3, further comprising:

changing, in response to the adding the new vehicle to the group, a relative distance between a first vehicle of the two or more vehicles, and a second vehicle of the two or more vehicles;
updating the set of rules to initiate the changing of the relative distance; and
updating the group view to display to updated relative distance.

5. The computer-implemented method of claim 1, further comprising:
updating the set of rules based on a change in environmental conditions.

6. The computer-implemented method of claim 1, wherein the group view includes a visual indication of, for each vehicle, a speed, a direction, and distance between each vehicle and each remaining vehicle in the group.

7. The computer-implemented method of claim 6, wherein the group view includes at least one object not in the group.

8. The computer-implemented method of claim 7, wherein the at least one object includes a non-group vehicle.

9. The computer-implemented method of claim 1, further comprising:
updating a configuration of the group of vehicles, wherein the updating comprises:
receiving, by the first vehicle, an input configured to perform the updating of the configuration;
comparing a final position of each vehicle to a current position of each vehicle in the group;
generating, in response to the comparing, a set of actions and an order of action required to perform the updating, wherein each action is correlated to one vehicle of the group; and
executing each action of the set of actions in the order.

10. The computer-implemented method of claim 9, wherein the executing each action further comprises:
sending each action of the set of actions to the correlated vehicle; and
receiving a notification of completion prior to sending the next action of the set of actions.

11. A system comprising:
a processor; and
a computer-readable storage medium communicatively coupled to the processor and storing program instructions which, when executed by the processor, are configured to cause the processor to:
link, over a network, two or more vehicles into a group of vehicles, wherein each of the two or more vehicles are at least partially automated, each of the vehicles includes a plurality of sensors, and each of the vehicles are performing a common task;
generate, for each vehicle, a 360 degree view of each vehicle with data from the plurality of sensors;
aggregate the 360 degree view for each vehicle into a group view, that includes each vehicle of the two or more vehicles;
display the group view on an augmented reality (AR) device a first vehicle, wherein the group view includes a relative location for each vehicle in the group of vehicles; and
apply a set of rules to the group of vehicles, wherein the rules provide instructions to each vehicle how to operate within the group, wherein the set of rules is configured to complete the common task.

12. The system of claim 11, wherein the program instructions are further configured to cause the processor to:
add a new vehicle to the group of vehicles, wherein the adding includes:
linking the new vehicle to each of the two or more vehicles;
updating the group view to include the new vehicle; and
applying the set of rules to the new vehicle.

13. The system of claim 12, wherein the addition of the new vehicle is in response to the new vehicle requesting to be added to the group.

14. The system of claim 11, wherein the group view includes a visual indication of, for each vehicle, a speed, a direction, and distance between each vehicle and each remaining vehicle in the group.

15. The system of claim 14, wherein the group view includes at least one object not in the group.

16. A computer program product, the computer program product comprising a computer readable storage medium having program instructions embodied therewith, the program instructions executable by a processing unit to cause the processing unit to:
determine two or more vehicles have linked over a network into a group of vehicles, wherein the group is configured to perform a common task, and each of the two or more vehicles:
are at least partially automated;
includes plurality of sensors; and
vehicles are performing the common task;
receive, from each vehicle, a 360 degree view from each vehicle of the two or more vehicles, wherein each 360 view is based on data from the plurality of sensors;
aggregate the 360 degree view for each vehicle into a group view, that includes each vehicle of the two or more vehicles;
send, to each vehicle, the group view, wherein the group view is configured to be displayed on an augmented reality (AR) device in each vehicle, wherein the group view includes a relative location for each vehicle in the group of vehicles; and
monitor the set of rules applied to the group of vehicles, wherein the rules provide instructions to each vehicle how to operate within the group, wherein the set of rules is configured to complete the common task.

17. The computer program product of claim 16, wherein the program instructions are further configured to cause the processing unit to:
add a new vehicle to the group view, wherein the adding includes:
determining the new vehicle is linked to each of the two or more vehicles;
updating the group view to include the new vehicle; and
sending the updated view to each vehicle including the new vehicle.

18. The computer program product of claim 17, wherein the addition of the new vehicle is in response to the new vehicle requesting to be added to the group.

19. The computer program product of claim 16, wherein the program instructions are further configured to cause the processing unit to:
determine a first vehicle is non-compliant with a first rule; and
send, a first instruction to the first vehicle, wherein the first instruction is configured to be compliant with the first rule, and the first instruction can be executed by the at least partially automated portion of the first vehicle.

20. The computer program product of claim 19, wherein the program instructions are further configured to cause the processing unit to:
send, in response to determining the first vehicle is non-compliant with the first rule, a second instruction to a second vehicle configured to change a location of the second vehicle in the group to allow the first vehicle to execute the first instruction.

* * * * *